(12) United States Patent
    Ferguson

(10) Patent No.: US 12,623,968 B2
(45) Date of Patent: May 12, 2026

(54) FUNCTIONALLY GRADED FIRING SETTERS AND PROCESS FOR MANUFACTURING THESE SETTERS

(71) Applicant: Lucian Garrett Ferguson, Mill Creek, WA (US)

(72) Inventor: Lucian Garrett Ferguson, Mill Creek, WA (US)

( * ) Notice: Subject to any disclaimer, the term of this patent is extended or adjusted under 35 U.S.C. 154(b) by 627 days.

(21) Appl. No.: 18/080,528

(22) Filed: Dec. 13, 2022

(65) Prior Publication Data

US 2023/0219853 A1      Jul. 13, 2023

Related U.S. Application Data

(60) Provisional application No. 63/298,613, filed on Jan. 11, 2022.

(51) Int. Cl.
| | |
|---|---|
| *C04B 35/053* | (2006.01) |
| *C04B 35/057* | (2006.01) |
| *C04B 35/626* | (2006.01) |
| *C04B 35/64* | (2006.01) |
| *F27D 5/00* | (2006.01) |

(52) U.S. Cl.
CPC .......... *C04B 35/053* (2013.01); *C04B 35/057* (2013.01); *C04B 35/62655* (2013.01); *C04B 35/64* (2013.01); *F27D 5/00* (2013.01); *C04B*

*2235/3206* (2013.01); *C04B 2235/3208* (2013.01); *C04B 2235/3244* (2013.01); *C04B 2235/6025* (2013.01); *C04B 2235/656* (2013.01); *C04B 2235/75* (2013.01); *C04B 2235/9669* (2013.01); *F27D 2005/0087* (2013.01)

(58) Field of Classification Search
None
See application file for complete search history.

(56) References Cited

U.S. PATENT DOCUMENTS

| | | | | |
|---|---|---|---|---|
| 3,713,877 A | * | 1/1973 | Kirchner et al. | ....... C04B 35/01 |
| | | | | 427/398.1 |
| 5,804,324 A | * | 9/1998 | Niwa | .................. C04B 41/5042 |
| | | | | 428/701 |

* cited by examiner

*Primary Examiner* — David Sample
(74) *Attorney, Agent, or Firm* — Barry Choobin; Patent 360

(57) ABSTRACT

A functionally graded firing setter that includes a substrate layer of cubic oxide; a top layer of unstabilized zirconium dioxide/hafnium dioxide; and a continuous transitional gradient layer disposed between the substrate layer and the top layer. The continuous transitional gradient layer includes cubic oxide stabilized zirconium dioxide/hafnium dioxide. The cubic oxide can be calcium oxide (CaO) or magnesium oxide (MgO).

9 Claims, 1 Drawing Sheet

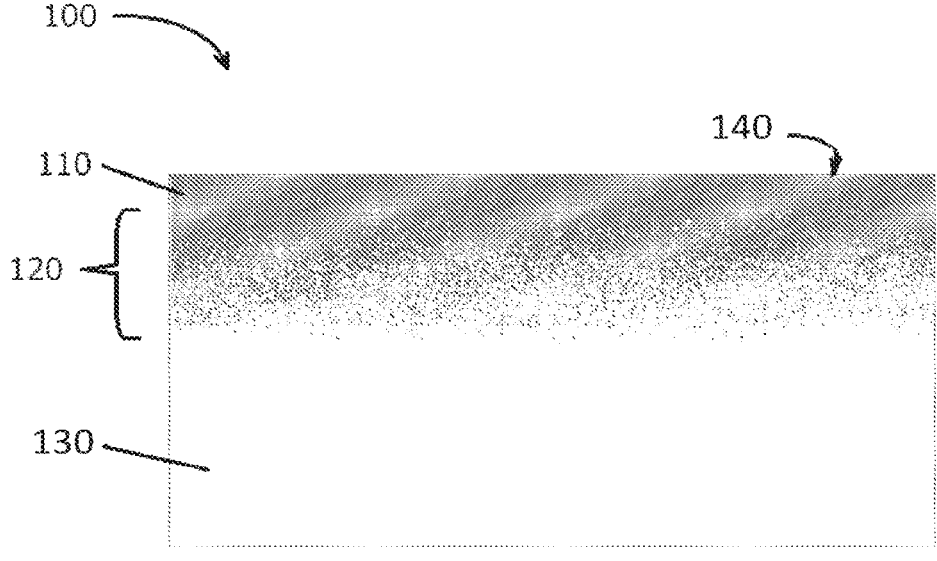

FUNCTIONALLY GRADED FIRING SETTERS AND PROCESS FOR MANUFACTURING THESE SETTERS

CROSS-REFERENCE TO RELATED APPLICATIONS

This application claims priority from a U.S. Provisional Patent Appl. No. 63/298,613 filed on Jan. 11, 2022, which is incorporated herein by reference in its entirety.

FIELD OF INVENTION

The present invention relates to firing setters, and more particularly, the present invention relates to firing setters with improved stability and inertness, and a method of manufacturing these firing setters.

BACKGROUND

The devices or fixtures by which ceramic and metal components are physically supported during the process of heat treating or firing them are called "setters" or kiln furniture. Other well-known nomenclature that is used for various configurations and types of fixtures include saggers, refractory plates, and other varieties of trays or substrates with rails or sidewalls.

The difficulties and challenges of heat treating or sintering reactive ceramic and metal materials are well known to persons skilled in the art. In a conventional production process, micron-sized reactive ceramic powders are mixed with an organic binder and then pressed, extruded, or tape cast to form "green" (unfired) components in the desired shape. The green component must then be heat treated at elevated temperatures to sinter or consolidate the component to the desired density and strength. The sintering process is typically performed with the green component placed in direct contact with a refractory plate or setter that must resist chemically reacting, sticking, or causing the component to crack and distort as it contracts and densifies. Thin green plates, membranes, and ceramic tapes are particularly difficult to sinter flat and distortion-free because they are exceptionally fragile and crack easily during the initial binder-burnout stages of firing. These components will often require an additional lightweight "cover plate" to keep them flat and prevent warping during firing. It is often desirable for the setter plates and cover plates to incorporate a certain amount of air porosity to allow gasses evolved from organic binders to escape without damaging the fragile green parts.

There are numerous examples of firing setters that are made from a variety of ceramic materials, including alumina ($Al_2O_3$), alumino-silicates, mullite, silicon carbide (SiC), yttria-stabilized zirconium dioxide (YSZ) and others, however alumina and alumino-silicate setters are most widely used industrially.

Despite being an indispensable industrial component, the known setter materials have several limitation or drawbacks. For example, setters containing alumina or silica ($SiO_2$) have adverse chemical reactions with many important technical materials including lithium-based solid electrolytes used in batteries, solid oxide fuel cell (SOFC) components that contain lanthanides and transition metals, nickel manganese compositions used in ferrites, piezoelectric ceramics and capacitors, dental zirconia, metal injection molded (MIM) compositions, and alloys that contain titanium or tungsten. Alumina-based setters also have poor thermal shock resistance and a tendency to exhibit excessive thermal creep or "slumping" at temperatures higher than about 1500° C., particularly in the porous form. Other conventional setter materials, such as silicon carbide and mullite have superior thermal creep resistance, but they contain elevated levels of silicon, a reactive glass former, which can contaminate components and cause them to stick and crack during firing.

Another type of conventional ceramic setter material, known as "stabilized" zirconium dioxide or zirconia, exhibits superior toughness and thermal shock resistance, but suffers from a lack of chemical inertness and tends to slump at temperatures above about 1100° C. Pure zirconium dioxide ($ZrO_2$) undergoes a well-known phase transformation from the monoclinic phase (stable at room temperature) to tetragonal at about 1173° C., and then to cubic at about 2370° C., according to below scheme:

monoclinic (1173° C.) ↔ tetragonal (2370° C.) ↔ cubic (2690° C.) ↔ melt

Pure $ZrO_2$ typically has no practical application for producing ceramic components due to the crystallographic phase transitions, and large accompanying volume change, which occurs during temperature cycling. The crystallographic volume change creates severe mechanical stress leading to cracking and catastrophic failure of the ceramic component. The cubic crystal structure of $ZrO_2$ can be made stable over a wider temperature range by the addition of different oxide compounds, which are termed "stabilizers". The oxides most used to form stabilized zirconia are calcium oxide (CaO), magnesium oxide (MgO), and yttrium oxide ($Y_2O_3$). The minimum amount of yttrium oxide needed to stabilize $ZrO_2$ is about 3-8 mole %, while the minimum amount of magnesium oxide is about 16-25 mole %, and the minimum amount of calcium oxide is about 16-30 mole %. The thermal coefficient of expansion (TCE) depends on the phase or stabilization of $ZrO_2$ as follows:

$$Pure\ monoclinic\ ZrO_2 = 7 \times 1^{-6}/K,$$

$$Pure\ tetragonal\ ZrO_2 = 12 \times 10^{-6}/K,$$

$$Y_2O_3\text{-stablized}\ ZrO_2 = 10.5 \times 10^{-6}/K,$$

$$MgO\text{-stablized}\ ZrO_2 = 11 \times 10^{-6}/K.$$

Dopants may diffuse into $Y_2O_3$-stabilized zirconia (YSZ) and principally react with the $Y_2O_3$ phase at temperatures greater than about 980° C. This process can lead to the formation of eutectic solutions and initiate massive diffusion, leaching, and destabilization. The stabilizing phase ($Y_2O_3$, MgO, CaO, etc.) may also diffuse out of the stabilized zirconia lattice and react with components in contact with the setter surface. Examples include detrimental interactions with metal injection molded (MIM) components, progressive corrosion with metal alloys that contain vanadium, and YSZ interactions with Lanthanum Strontium Manganate (LSM) fuel cell components.

In some instances, powdered ceramics ($Al_2O_3$, $ZrO_2$, etc.) have been applied to furnace fixtures either as dry powders or aqueous washes which are then dried to leave a powder residue that is intended to prevent components from sticking to the fixture surface. This process does not provide a reliable barrier to contamination and can result in poor yields. In addition, the process is time consuming and must be repeated after each firing cycle, adding extra production cost.

Others have attempted to produce refractory setters that incorporate a firing surface for contacting ceramic and metal components which avoids chemical contamination during the elevated temperature heat treating process. Prior art methods for applying a zirconia coating onto various dissimilar base substrates have included techniques such as thermal spraying (flame or plasma), aerosol spray coating, sol-gel coating, vapor deposition, and dip coating. The base substrate is typically alumina, or stabilized zirconia, and must be at least partially sintered to ensure a certain degree of mechanical and chemical stability before the coating is applied. These prior art coating techniques all rely primarily on a mechanical bonding mechanism, and their adhesion is based on actually penetrating into the pores or voids of a rough surface, thereby interlocking onto the substrate.

Because there is no substantial chemical bonding or reaction product, these coatings are prone to cracking and peeling off the base or substrate. Additionally, these mechanically bonded coatings will tend to incorporate voids, cracks, and other defects as they dry or solidify on the pre-sintered base substrates. Among the liquid phase coating methods, in the dip-coating, spray coating, and sol-gel coating process, a coating layer is gelled in the drying stage and simultaneously undergoes a large unavoidable contraction (shrinkage) due to evaporation of the solvent vehicle. The contraction of the coating layer causes a stress between the coating layer and the base substrate, and this stress becomes more severe in the sintering process, causing the coating layer to crack and peel off the base substrate.

Various efforts to improve the performance of conventionally known setters can be found in the prior art, however they have proved less than satisfactory. For example, U.S. Pat. No. 5,804,324 teaches the forming of a refractory setter by sintering a base and applying a subsequent coating layer in which the base comprises at least one of $Al_2O_3$, MgO or $ZrO_2$ in an amount of 70 wt. % or more, the coating layer contains at least one main component selected from the group consisting of $Al_2O_3$, MgO and $ZrO_2$ in an amount of 80 wt. % or more and 0.5 to 10.0 wt. % of at least one additional component selected from $Fe_2O_3$, $TiO_2$, BaO, SrO, $ZrO_2$, CaO, and MgO (different from CaO and MgO used as a stabilizer for $ZrO_2$). The base may be coated by pouring or spraying a slurry on the base. Thereafter, the coating material is bonded to the base by heating. Alternatively, the coating material may be flame sprayed onto the base. The additional component in the coating layer must be different from the main components, and results in a dense or hardened coating layer that is less likely to peel off the base layer. Unfortunately, as described in U.S. Pat. No. 5,804,324 and others, the additives that are used to promote sintering, or "sintering aids" as they are sometimes called, significantly lower the useful service temperature of the setter, and can contaminate or react with sensitive components that are in contact with the surface. Furthermore, flame sprayed coatings and slurry coatings that are applied onto a sintered base substrate do not form reaction products or strong chemical bonds with the base, and are subject to cracking and peeling. Another, U.S. Pat. No. 6,461,156 teaches methods for manufacturing a firing setter with plural through-holes, wherein the firing setter has an alumina content of at least 70% and the firing setter is produced by a process comprising extruding a plasticized powder to form a green body, drying the green body, and firing the dried green body. In one preferred embodiment, the firing setter may have a coating of stabilized zirconia or magnesia on at least one surface of the firing setter. The inventors claim this coating is suited especially for an application in which a material of the electronic device components or the like reacts with a material of the setter (such as alumina or silica). As a coating process, it is preferred to prepare a slurry of stabilized zirconia or magnesia powder dispersed in water, to apply the thus-prepared slurry onto a desired part of the setter by dipping the setter in the slurry or spraying the slurry onto the setter, and then to sinter the thus-applied slurry on the setter at a temperature of about 1,400° C. While the inventors in U.S. Pat. No. 6,461,156 attempt to provide coatings that are less reactive than the alumina/silica base setter material, coatings containing magnesia (MgO), or zirconia with stabilizers such as $Y_2O_3$, can still contaminate and react with many components that are in contact with the coating surface. Furthermore, the sprayed or dipped coatings do not form reaction products or strong chemical bonds with the base and are subject to peeling and cracking.

Another, U.S. Pat. No. 5,603,875 teaches a method for providing a furnace fixture which is made from a substrate selected from the group consisting of silicon carbide, cordierite ($2MgO·2Al_2O_3·5SiO_2$), mullite ($3Al_2O_3·2SiO_2$), stabilized zirconia, magnesium oxide and alumina containing a glassy bond phase. A cladding layer of zirconia or magnesia is then deposited on the furnace fixture substrate by plasma deposition. The preferred substrate comprises a previously fired thin plate made from silica-containing alpha alumina. The glassy phase containing silica is said to provide improved bonding of the plasma spray zirconia or magnesia cladding. As disclosed in U.S. Pat. No. 5,603,875 the introduction of a glassy bonding phase may improve the peel resistance of the deposited zirconia or magnesia (MgO) coating, however there are some serious disadvantages. The glassy bonding phase is composed mainly of silicon oxides and alkali earth modifiers that will diffuse or dissolve into coating layers at higher temperatures and cause sticking, cracking, and contamination of components that are in contact with the firing surface. Powder metal-based components, including tungsten and titanium alloys, are especially sensitive to silicon contamination. Furthermore, at higher temperatures, glass and inorganic vitreous phases will tend to melt or soften, and coatings will separate or fail to adhere to them.

Still others have attempted to provide various improvements involving the bonding and peeling resistance of zirconia coatings that are applied to a dissimilar base substrate. For example, Japanese Patent Application 03-223193 discloses a 3-layer saggar structure comprised of a base substrate made of alumina and silica (mullite, cordierite, etc.), an intermediate layer consisting of calcia-stabilized zirconia and yttria-stabilized zirconia, and a coating layer of stabilized zirconia. The intermediate layer is applied as a (kneaded) mixture to the base substrate and fired. The intermediate layer is said to increase the peel resistance of the surface coating. While the intermediate layer may help to increase the peeling resistance to a limited degree, this method is still unsatisfactory because the intermediate layer does not form a reaction product or a strong chemical bond with other layers and relies only on a weaker form of mechanical bonding. Furthermore, the zirconia coating layer contains stabilizers such as yttria which can contaminate components in contact with the surface. Another, Japanese Patent Application 03-177379 teaches methods for producing a layered sequence of coatings on an alumina base substrate, wherein the molar ratio of $Al_2O_3$ to $ZrO_2$ particles is incrementally decreased with each layer. As each layer of slurry is applied to the alumina base, the molar ratio of $Al_2O_3$ to $ZrO_2$ particles in the slurry is decreased by 10-20%. The coating and drying process is repeated until 5-10 layers have been applied to give a cumulative coating thickness that is preferably 50 to 300 microns. The coatings are then fired onto the substrate at 1400° C. to 1600° C. While the methods of Japanese Patent Application 03-177379 may provide limited improvements in the TCE mismatch between the alumina base and the $Al_2O_3/ZrO_2$ coatings, this method is labor intensive and cost prohibitive. Furthermore, the coatings do not form reaction products or strong chemical bonds between layers and are subject to peeling. Additionally, the coatings contain $Al_2O_3$ which can contaminate components in contact with the surface.

Another, Japanese Patent Application 04-224172 teaches the method of molding a setter base material using alumina or an alumina/zirconia mixture. After drying the molded base, a stabilized zirconia slurry is applied onto the surface of the molded base by a method such as brush coating, dipping, or spraying to form a zirconia coating layer. The molded base and the zirconia coating layer are then simultaneously fired at about 1600° C. The Inventors claim that a diffusion reaction occurs at the interface between the alumina base and the zirconia coating layer to form a zirconia diffusion layer. The zirconia coating layer is said to have a large peeling strength as a result of the zirconia diffusion layer.

According to some references, however, the solubility of $ZrO_2$ in $Al_2O_3$ is less than 0.008 mole %, and it is evident that the zirconia coating and manufacturing process as disclosed in Japanese Patent Application 04-224172 will result in a minimal solid solution of $ZrO_2$ in the $Al_2O_3$ base. Any reaction product will therefore be insufficient to produce a strong chemical reaction-bond between the coating and the alumina base. Furthermore, stabilizers such as yttria in the zirconia coating and $Al_2O_3$ in the base, may diffuse and contaminate components in contact with the coating surface.

A need is therefore appreciated for novel firing setters and processes that are devoid of the aforesaid deficiencies and drawbacks.

SUMMARY OF THE INVENTION

The following presents a simplified summary of one or more embodiments of the present invention to provide a basic understanding of such embodiments. This summary is not an extensive overview of all contemplated embodiments and is intended to neither identify critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to firing setters that have a surface for contacting the ceramic and powder metal components which is stable at elevated temperatures and avoids chemical contamination of the components.

It is another object of the present invention that the firing setter is cost-effective to manufacture and does not require expensive manufacturing equipment.

It is still another object of the present invention that the firing setter is chemically inert.

It is yet another object of the present invention that the firing setters can be cycled to elevated temperatures (>1650° C.) without excessive warping, slumping, spalling, delamination, or cracking.

In one aspect, disclosed are methods for manufacturing and utilizing functionally graded firing setters that are chemically non-reactive, durable, and peel resistant up to temperatures well in excess of 1650° C. in air atmospheres.

In one aspect, disclosed are the firing setters that include firing surfaces comprised of pure un-stabilized $ZrO_2/HfO_2$, a polymorphic phase transition material that is highly inert, and that provides novel non-sticking properties. Without wishing to be limited by theory, it is believed that any phase transition that might occur at the un-stabilized $ZrO_2/HfO_2$ surface during thermal cycling could provide a de-bonding mechanism that helps prevent sticking of components in contact with the surface.

In one aspect, the setters of the present invention provide firing surfaces that are essentially free of alumina, stabilized zirconia, magnesia, and silicates, which comprise the primary materials of essentially all other conventional setters, and which materials can potentially contaminate many important technical components during the firing process.

In one implementation, strong, chemical reaction-bonding of the un-stabilized $ZrO_2/HfO_2$ coating surface can be achieved by incorporating a continuous transitional gradient comprised of $ZrO_2/HfO_2$ phases that are stabilized by cubic oxides, preferably MgO or CaO, which cubic oxides also comprise the base substrate. The continuous transitional gradient is highly beneficial for accommodating the thermal coefficient of expansion (TCE) mismatch between the pure cubic oxide substrate and the pure unstabilized $ZrO_2/HfO_2$ surface coating, and thereby preventing peeling or cracking of the coating.

In some embodiments, co-casting methods are used to create intimate mixing at the liquid interface between a substrate layer containing pure cubic oxide particles and a surface layer containing pure unstabilized $ZrO_2/HfO_2$ particles. Before drying is complete, the otherwise abrupt transition at the interface between the substrate of the firing setter and the pure unstabilized $ZrO_2/HfO_2$ layer is thereby converted into a continuous gradient by material transport.

In some embodiments of the present invention, a process consisting of at most two co-casting steps is used to create the functionally graded firing setters. In the first step, a slurry comprised of preferred organic binders, dispersants, plasticizers, rheology modifiers, and cubic oxide particles, preferably MgO or CaO, is tape cast onto a release film to form a substrate layer. In the second step, and preferably before the substrate layer is fully dried, a second slurry consisting of preferred organic binders, dispersants, plasticizers, rheology modifiers, and pure unstabilized $ZrO_2/HfO_2$ particles is tape cast onto the partially dried substrate layer. After the co-cast bi-layer structure has fully dried or cured, the release film is removed, and the bi-layer structure is reaction sintered at approximately 1560° C. to 1650° C.

In some embodiments of the present invention, an essentially pure unstabilized $ZrO_2/HfO_2$ surface layer is chemically bonded through solid state reaction sintering to an essentially pure cubic oxide substrate, preferably MgO or CaO, and no thermal (plasma) spray, aerosol spray, or dip coating step is performed.

According to the present invention, no lamination step, nor any pressure, vacuum, or heating is required to achieve strong chemical bonding.

In one implementation, the firing setters of the present invention provide at least one surface comprised essentially of pure unstabilized $ZrO_2/HfO_2$, and no more than 0.1 wt. % unavoidable impurities including silica or other bonding agents.

The firing setters of the present invention are useful in a unique capacity for heat treating and sintering solid oxide fuel cell (SOFC) components, Li-ion battery components, hard and soft ferrites, piezoelectric, zinc oxide and titanate-based capacitors, beryllium oxide components, superconductors, dental and bio-ceramic components, and other components that are chemically incompatible with conventional prior art setters.

The firing setters of the present invention are useful in a unique capacity for heat treating and sintering metal injection molded (MIM) and powder metallurgy components including stainless steels, titanium, tungsten, magnesium, alloys containing V, Cr, Cu, Ti, Zn, Mg, Ni, and Si, and other metal-based products that are chemically incompatible with conventional prior art setters.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

FIG. 1 is a schematic diagram that depicts a functionally graded firing setter, in accordance with embodiments of the present invention.

DETAILED DESCRIPTION

Subject matter will now be described more fully hereinafter. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as apparatus and methods of use thereof. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

The following detailed description is described with reference to the drawings, wherein like reference numerals are used to refer to like elements throughout. In the following description, for purposes of explanation, specific details may be set forth in order to provide a thorough understanding of the subject innovation. It may be evident, however, that the claimed subject matter may be practiced without these specific details. In other instances, well-known structures and apparatus are shown in block diagram form in order to facilitate describing the subject innovation.

As defined herein, the term "conventional setters" refers to setters with firing surfaces that contain alumina, stabilized zirconia, magnesia, silicates, or other glassy phases.

As defined herein, the term "pure" refers to any oxide compound or mixture of oxide compounds that is essentially pure, with the exception of minor or trace impurities that may be unavoidable in commercially available sources.

As defined herein, the term "pure unstabilized $ZrO_2$/$HfO_2$" refers to unstabilized $ZrO_2$, unstabilized $HfO_2$, and any mixtures thereof, that are essentially pure, with the exception of minor or trace impurities that may be unavoidable in commercially available sources. Commercial sources of unstabilized $ZrO_2$ typically contain a small naturally occurring $HfO_2$ phase in the range of 1-5 wt. %. Because the chemical and physical properties of $HfO_2$ are very similar to $ZrO_2$, low percentages of $HfO_2$ do not significantly influence the properties or crystallographic behavior of the $ZrO_2$/$HfO_2$ mixture compared with the pure $ZrO_2$ phase.

As defined herein, the term "co-casting" refers to any of several methods for depositing a viscous paste or castable slurry to form a substrate layer, and subsequently coating the substrate layer with a second viscous paste or castable slurry consisting of a dissimilar material. Preferred co-casting methods include doctor blade casting or tape casting a slurry from an extruding hopper that rides above the casting area. Co-casting can be accomplished with two or more doctor blades in staged tandem arrangements, or by making multiple passes over preexisting layers with a single doctor blade. Other deposition methods known as micro extrusion, robocasting, and direct ink writing (DIW) are also considered suitable co-casting methods for the purposes of this invention. Compared to spray coating techniques, co-casting methods generally provide better uniformity and fewer voids.

It is clear that many important ceramic and powder metal components are not compatible with conventional setters that contain alumina, stabilized zirconia, magnesia, and silicates. Novel setters are disclosed that can provide chemically inert, non-stick, stable firing surfaces for heat treating and sintering these important components at higher temperatures and in various atmospheres.

In some embodiments, the novel setters of the present invention provide firing surfaces that are nonreactive with solid oxide fuel cell (SOFC) components, anodes containing strontium, iron, cobalt, and molybdenum (SCFM), Ni-based cermet anodes, vanadium-doped strontium titanate (SVT) anodes, vanadium and sodium-doped strontium niobate (SNNV) anodes, Lanthanum Strontium Manganite (LSM) components, and components containing any of the volatile species consisting of Co, Mn, Mo, Ni, Cr, V, Bi, Li, Na, and Cu.

In some embodiments, the novel setters of the present invention provide firing surfaces that are nonreactive with soft and hard ferrites, nickel manganate ceramics, barium titanate and other titanate-based electronic components, piezoelectric lead zirconium titanates (PZT), zinc oxide varistors, NTC and PTC components, YBCO and superconducting materials, dental and bio-medical ceramics, and beryllium compounds (BeO).

In some embodiments, the novel setters of the present invention provide firing surfaces that are nonreactive with metal-based components, including powder metallurgy components obtained by injection molding (MIM) and additive manufacturing processes (DIW) that contain alloys of titanium, tungsten, molybdenum, vanadium, magnesium, stainless steel, and alloys that contain silicon.

In some preferred embodiments, the novel setters of the present invention are characterized by a pure MgO base substrate that transitions to a pure unstabilized $ZrO_2/HfO_2$ surface layer through a continuous, functionally graded region containing MgO-stabilized $ZrO_2/HfO_2$. The graded transition region includes approximately 4-30 mol % MgO-stabilized $ZrO_2/HfO_2$ and provides a strong reaction-based chemical bond between the pure MgO substrate and the unstabilized $ZrO_2/HfO_2$ surface layer, which greatly increases the resistance to cracking and peeling. The graded MgO-stabilized $ZrO_2/HfO_2$ transition region also provides critical TCE strain compensation between the pure MgO substrate and the unstabilized $ZrO_2/HfO_2$ surface layer which further enhances resistance to peeling and cracking at high temperatures.

In some embodiments, the novel setters of the present invention may include a base substrate that consists of MgO, CaO, $Y_2O_3$, $CeO_2$, or any of the cubic oxides that are soluble in $ZrO_2/HfO_2$, however MgO and CaO are preferred. It has been found that CaO-stabilized and MgO-stabilized $ZrO_2/HfO_2$ are more resistant to phase migration than $Y_2O_3$-stabilized $ZrO_2/HfO_2$, and they exhibit superior high-temperature strength and corrosion resistance. Additionally, the cost of $Y_2O_3$, $CeO_2$, and other rare earth oxides may be prohibitively high for many applications.

Referring to FIG. 1 which shows an exemplary embodiment of the disclosed firing setter. The firing setter 100 includes a top layer 110 consisting essentially of unstabilized zirconium dioxide, unstabilized hafnium dioxide, or a combination thereof, a substrate layer 130 consisting essentially of cubic oxide, and a continuous transitional gradient layer 120 disposed between the substrate layer and the top layer. The continuous transitional gradient layer includes cubic oxide stabilized zirconium dioxide, cubic oxide stabilized hafnium dioxide, or a combination thereof. The top surface 140 of the firing setter 100 includes pure unstabilized zirconium dioxide, unstabilized hafnium dioxide, or a combination thereof.

In some preferred embodiments of the present invention, a casting slurry is prepared by mixing together pure MgO powders with suitable solvents, dispersants, surfactants, organic binders, and plasticizers. Another casting slurry consisting of pure unstabilized $ZrO_2/HfO_2$ powders with suitable solvents, dispersants, surfactants, organic binders, and plasticizers is prepared separately. The MgO slurry is then tape cast onto a suitable carrier, such as a silicone-coated polyethylene terephthalate (Mylar) film, to produce a well-dispersed uniform layer of MgO slurry situated on top of the carrier. After waiting a predetermined time, and before the MgO slurry layer has dried, the pure $ZrO_2/HfO_2$ slurry is then co-cast over the pure MgO substrate layer. After fully drying, the carrier can then be removed, and the co-cast tape bilayer can be sintered at approximately 1560° C.-1650° C. to produce a functionally graded setter with a reaction-bonded pure unstabilized $ZrO_2/HfO_2$ surface that is peel resistant and crack-free. Surprisingly, it has been found that this novel process produces a firing setter with a pure unstabilized $ZrO_2/HfO_2$ surface that is chemically inert, warp resistant, and structurally stable up to temperatures well above 1650° C.

In some embodiments of the present invention, a casting slurry is prepared by mixing together pure CaO powders with suitable solvents, dispersants, surfactants, organic binders, and plasticizers. Another casting slurry consisting of pure unstabilized $ZrO_2/HfO_2$ powders with suitable solvents, dispersants, surfactants, organic binders, and plasticizers is prepared separately. The CaO slurry is then tape cast onto a suitable carrier, such as a silicone-coated polyethylene terephthalate (Mylar) film, to produce a well-dispersed uniform layer of CaO slurry situated on top of the carrier. After waiting a predetermined time, and before the CaO slurry layer has dried, the pure unstabilized $ZrO_2/HfO_2$ slurry is then co-cast over the pure CaO substrate layer. After fully drying, the carrier can then be removed, and the co-cast tape bilayer can be sintered at approximately 1560° C.-1650° C. to produce a functionally graded setter with a reaction-bonded pure unstabilized $ZrO_2/HfO_2$ surface that is peel resistant and crack-free. Surprisingly, it has been found that this novel process produces a firing setter with a pure unstabilized $ZrO_2/HfO_2$ surface that is chemically inert, warp resistant, and structurally stable up to temperatures well above 1650° C.

The formation of the substrate slurries can be accomplished by mixing together suitable cubic oxide powders with solvents, dispersants, surfactants, organic binders, and plasticizers. Suitable cubic oxide powders include MgO, CaO, $CeO_2$, and $Y_2O_3$, preferably pure MgO and pure CaO, and most preferably pure MgO. High purity, low silica, cubic oxide powders are preferred, and most preferably an electrically fused version of MgO due to its lower chemical reactivity. Cubic oxide powders with sieve sizes between 325 and 140 mesh are preferred.

Formation of the surface co-casting slurries can be accomplished by mixing together suitable pure unstabilized $ZrO_2/HfO_2$ powders with solvents, dispersants, surfactants, organic binders, and plasticizers. Powders with unstabilized $ZrO_2+HfO_2>99.6$ wt. % and silica impurities<0.3 wt. % are preferred. Unstabilized $ZrO_2/HfO_2$ powders with sieve sizes between 325 and 140 mesh are preferred.

In some preferred embodiments, the solvents and organic binders comprising both the substrate and surface co-casting slurries are chosen so that they are mutually soluble to a high degree, thereby promoting intermixing of particles and mass transport at the co-casting interface.

In some embodiments of the present invention, preferred solvents for producing tape casting slurries include n-butyl acetate, tert-Butyl acetate, ethyl acetate, isoparaffinic solvents, cyclohexanone, water, and other solvents that are considered to have low toxicity or environmental hazards.

In some embodiments of the present invention, preferred organic binders for non-aqueous tape casting slurries include polyvinyl butyral (60,000-1,000,000 MW), ethyl methacrylate copolymers, poly(propylene carbonate) and poly(methyl methacrylate).

In some embodiments of the present invention, preferred organic binders for aqueous tape casting slurries include polyvinyl alcohol-based polymers, polyvinylpyrrolidone, cellulose ethers, polyethyloxazoline (5,000-500,000 MW), acrylic copolymers, and acrylic latex emulsions.

In some embodiments of the present invention, preferred dispersants for non-aqueous tape casting slurries include Menhaden fish oil, stearic acid, oleic acid, glycerol trioleate, poly(12-hydroxystearic acid), polyethylene glycol tert-octylphenyl ether, and polyoxyethylenesorbitan monooleate.

In some embodiments of the present invention, preferred dispersants for aqueous tape casting slurries include oleic acid, glycerol trioleate, Dolapix CE64 (ammonium salt of a polycarboxylic acid, Zschimmer and Schwarz GmbH Co.), citric acid, stearic acid, polyethylenimine (1300-2,000,000 MW), ammonium salt of poly(acrylic acid), and poly(oxyethylene nonylphenol ether).

In some embodiments of the present invention, preferred plasticizers for non-aqueous tape casting slurries include polyethylene glycol, polyalkylene glycol, dioctyl phthalate and benzyl butyl phthalate.

In some embodiments of the present invention, preferred plasticizers for aqueous tape casting slurries include poly (propylene glycol), glycerol, dibutyl phthalate, and propylene glycol.

The carrier can be any flexible or rigid layer capable of supporting the slurries or viscous paste including plastic, metals, glass, ceramics, or silicone-coated polyethylene terephthalate (Mylar) film.

The green (unfired) co-cast multilayer can be reaction sintered at temperatures from about 1200° C. to about 1850° C., preferably from about 1560° C. to about 1650° C., in air or inert atmospheres.

Without wishing to be limited by theory, it is believed that the co-casting process creates a liquid interface which facilitates intimate mixing between cubic oxide particles from the substrate and pure unstabilized $ZrO_2/HfO_2$ particles from the coating. Before drying is complete, the otherwise abrupt transition at the substrate/coating interface is thereby converted into a continuous gradient by material transport. Gradients of the volume content of phases and gradients in chemical composition of a single phase can both occur, depending on the solubility of the components. It is believed that gradient formation can be enhanced by forced and thermal convection, and the depth of the graded interface is predominantly controlled by the degree of solidification of the first (substrate) cast at the time when the second (coating) cast is applied. Particle intermixing is further enhanced by using an organic binder for formulating both the substrate slurry and the pure unstabilized $ZrO_2/HfO_2$ slurry that is readily dissolved by a common solvent, preferably water.

During the reaction sintering process, diffusion results in the formation of a continuous transitional gradient that includes $ZrO_2/HfO_2$ phases that are stabilized by cubic oxides from particle intermixing that has taken place.

It is further believed that this transitional cubic oxide stabilized $ZrO_2/HfO_2$ gradient is highly beneficial for accommodating the thermal coefficient of expansion (TCE) mismatch between the pure cubic oxide substrate and the pure unstabilized $ZrO_2/HfO_2$ surface coating. While phase diagrams for all stabilized $ZrO_2/HfO_2$ systems are not fully established, it is known that certain cubic oxides including MgO, CaO, $Y_2O_3$, and $CeO_2$ are soluble in $ZrO_2/HfO_2$. By alloying pure $ZrO_2/HfO_2$ with these cubic oxides, it is possible to stabilize the alloy "partially" or "fully" such that the cubic zirconia phase is retained upon cooling from high temperatures, thereby preventing the destructive crystallographic volume change that would otherwise occur. It is known that fully stabilized zirconia compositions retain the wholly cubic structure on cooling, while partially stabilized zirconia produces large cubic grains within which are dispersed tetragonal precipitates that transform under stress and prevent crack propagation. According to most references, 8-12 mol % addition of MgO results in a partially stabilized zirconia structure, and more than 13 mol % of MgO results in a fully stabilized cubic zirconia structure.

Example 1

The processing of the novel firing setters starts with the preparation of essentially pure MgO and pure unstabilized $ZrO_2/HfO_2$ slurries. The compositions of the MgO and unstabilized $ZrO_2/HfO_2$ slurries can be found in Table 1.

TABLE 1

Compositions of the MgO and pure unstabilized $ZrO_2/HfO_2$ slurries:

| Category/ Purpose | Ingredient | MgO slurry wt. % | $ZrO_2/HfO_2$ slurry wt. % |
|---|---|---|---|
| Ceramic powder | MgO (99.9%), −200 mesh | 74.06 | — |
| | Unstabilized $ZrO_2/HfO_2$ ($ZrO_2$ + $HfO_2$ > 99.6%) d50 = 3.0 – 6.0 micron | — | 67.17 |
| Dispersants | Menhaden fish oil | 0.74 | — |
| | Menhaden fish oil | — | 0.67 |
| Solvents | n-Butyl acetate | 19.81 | 23.03 |
| Plasticizers | Benzyl butyl phthalate | 1.15 | 1.84 |
| Binders | Ethyl methacrylate copolymer[1] | 4.24 | 7.29 |

[1]Paraloid ™ B-72, The Dow Chemical Company

The solvents, dispersants, and ceramic powders are ball-milled overnight for approximately 16 hours, before adding the binders and plasticizers, and ball-milling the slurries again for another 16 to 24 hours to obtain uniform well dispersed slurries. The MgO slurry is tape cast in a relatively thick layer, 1.0 mm-2.0 mm, on a silicone-coated Mylar film with a 10-inch-wide doctor blade. After the MgO substrate layer is partially dried on the casting bed, usually about 15 minutes, the $ZrO_2/HfO_2$ slurry is cast over the MgO substrate layer using a doctor blade with a gap that is adjusted to give a $ZrO_2/HfO_2$ slurry thickness of about 0.012 inches. The resulting co-cast bilayer tape is then dried on the casting bed, and after about 4-6 hours, it is cut using a metal punch into the desired shapes. Sintering of the co-cast tape bilayers is carried out in a high temperature furnace. The furnace temperature is raised to a temperature of 400° C., at a rate of 1° C. per minute, and held for 4 hours to decompose and vent organic components. The temperature is finally raised to 1600° C., at a rate of 1° C. per minute, and held for 2 hours to reaction sinter the co-cast tape bilayer and produce the functionally graded firing setter.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A functionally graded firing setter comprising:
   a substrate layer consisting essentially of cubic oxide selected from a group consisting of calcium oxide (CaO), magnesium oxide (MgO), yttrium oxide (Y2O3), and cerium dioxide (CeO2);
   a top layer consisting essentially of unstabilized zirconium dioxide, unstabilized hafnium dioxide, or a combination thereof; and a continuous transitional gradient layer disposed between the substrate layer and the top layer, wherein the continuous transitional gradient layer comprises cubic oxide stabilized zirconium dioxide, cubic oxide stabilized hafnium dioxide, or a combination thereof, wherein the functionally graded firing setter are chemically non-reactive and peel resistant at temperatures of about 1650° C. in air atmospheres, wherein a surface of the firing setter consists of unstabilized zirconium dioxide, unstabilized hafnium dioxide, or a combination thereof, and is essentially free of alumina, stabilized zirconia, magnesia, and silicates.

2. The functionally graded firing setter according to claim 1, wherein the cubic oxide is selected from a group consisting of calcium oxide (CaO) and magnesium oxide (MgO).

3. The functionally graded firing setter according to claim 1, wherein the top layer is chemically bonded to the substrate layer through solid state reaction sintering.

4. The functionally graded firing setter according to claim 1, wherein the cubic oxide is calcium oxide (CaO).

5. The functionally graded firing setter according to claim 1, wherein the cubic oxide is magnesium oxide (MgO) and the continuous transitional gradient layer comprises 4-30 mol % MgO-stabilized zirconium dioxide and/or MgO stabilized hafnium dioxide.

6. A functionally graded firing setter prepared by a method comprising:

preparing a first slurry consisting essentially of a cubic oxide selected from a group consisting of calcium oxide (CaO), magnesium oxide (MgO), yttrium oxide (Y2O3), and cerium dioxide (CeO2);

preparing a second slurry consisting essentially of unstabilized zirconium dioxide, unstabilized hafnium dioxide, or a combination thereof;

depositing the first slurry over a planar carrier;

maintaining the first slurry deposited over the planar carrier for a predetermined duration;

after the predetermined duration, depositing the second slurry over the maintained first slurry;

upon depositing the second slurry, drying the deposited second slurry and the maintained first slurry; and upon drying, sintering the dried second slurry and the first slurry at a predetermined temperature range to obtain the functionally graded firing setter, wherein a surface of the firing setter consists of unstabilized zirconium dioxide, unstabilized hafnium dioxide, or a combination thereof, and is essentially free of alumina, stabilized zirconia, magnesia, and silicates.

7. The functionally graded firing setter according to claim 6, wherein the cubic oxide is selected from a group consisting of calcium oxide (CaO) and magnesium oxide (MgO).

8. The functionally graded firing setter according to claim 6, wherein the predetermined temperature range is about 1560° C. to 1650° C.

9. The functionally graded firing setter according to claim 6, wherein the first slurry is deposited by tape casting, the first slurry is maintained for partially drying, and the second slurry is deposited by co-casting over the partially dried first slurry.

* * * * *